INVENTORS
John Himka &
BY Lawrence Shinoda
David A. Greenlee
ATTORNEY

Jan. 6, 1970  J. HIMKA ET AL  3,488,086
VEHICLE BODY
Filed March 11, 1968  2 Sheets-Sheet 2
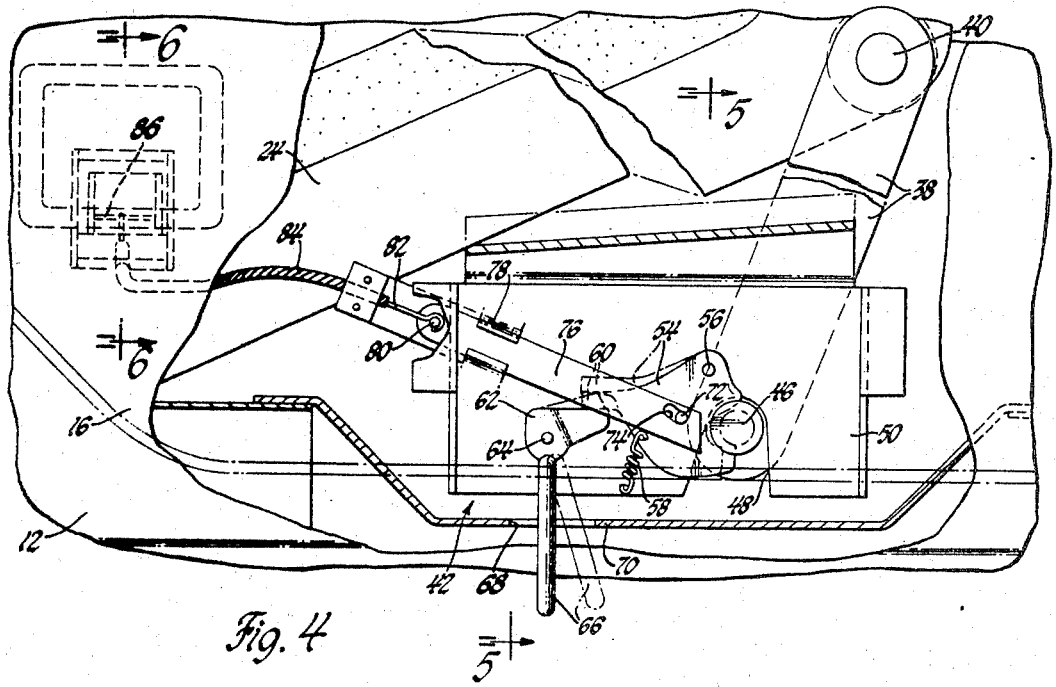
Fig. 4
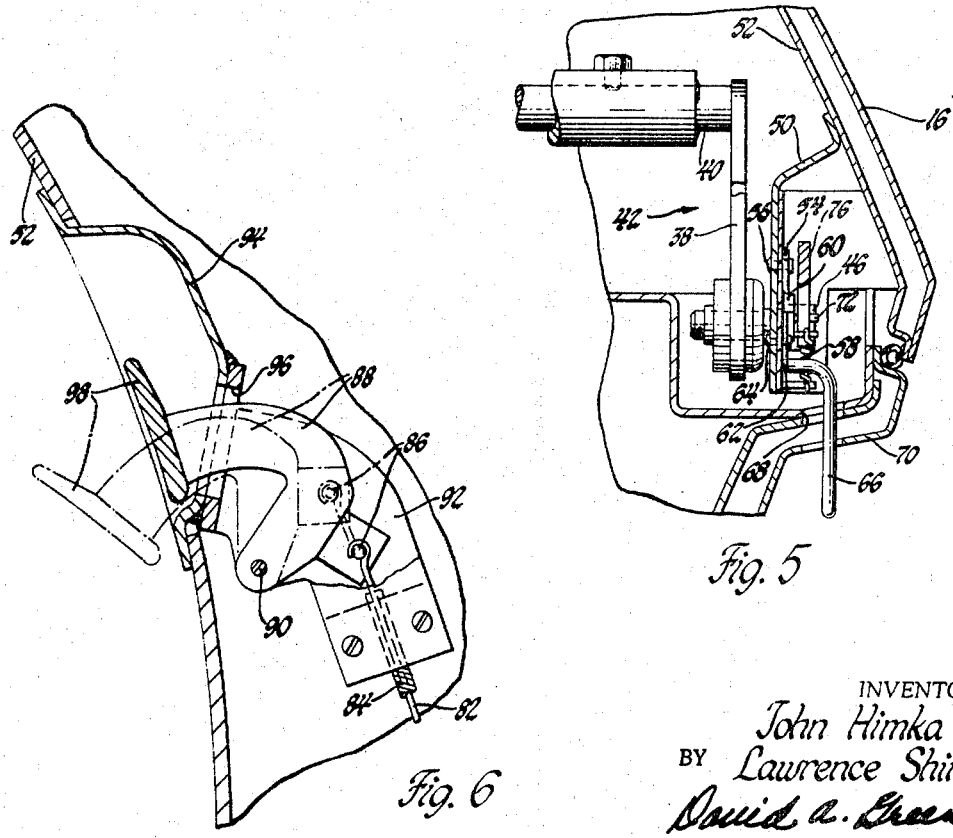
Fig. 5
Fig. 6
INVENTORS
John Himka &
BY Lawrence Shinoda
David A. Greenlee
ATTORNEY

United States Patent Office 3,488,086
Patented Jan. 6, 1970

3,488,086
VEHICLE BODY
John Himka, Farmington, and Lawrence Shinoda, Utica, Mich., assignors to General Motors Corporation, Detroit, Mich., a corporation of Delaware
Filed Mar. 11, 1968, Ser. No. 711,979
Int. Cl. B60n 1/02
U.S. Cl. 296—65
4 Claims

ABSTRACT OF THE DISCLOSURE

A vehicle body is provided with a reclining occupant seat and a movable canopy normally connected to the seat. An actuator is provided for elevating the seat and opening the canopy to assist in occupant ingress and egress. A latch mechanism is provided for releasing the canopy from the seat to enable movement of the canopy independently of the seat.

---

This invention relates generally to vehicle bodies and more particularly to a vehicle body having a movable seat and a movable passenger compartment closure.

Over the years, the height of motor vehicles has been significantly lowered. Further height reductions are limited because of the headroom required by the vehicle occupants. To accommodate even further reductions in vehicle height, while maintaining adequate road clearance, the seating position of vehicle occupants must be changed from substantially vertical to a more reclining or horizontal position. Such a reclining seating position, however, makes ingress and egress of the occupant very difficult.

This invention provides a vehicle having a low height or silhouette and a reclining occupant seating position, while permitting relatively easy occupant ingress and egress.

It is an object of this invention to provide a vehicle having a movable compartment closure and an interconnected movable occupant seat which elevates upon canopy opening to enhance occupant ingress and egress. It is another object to provide means releasably interconnecting the seat and canopy to enable movement of the canopy independently of the seat.

These and further objects of this invention will become readily apparent upon reference to the following detailed description of the annexed drawings in which:

FIGURE 4 is an enlarged detail view of the releasable interconnection between the seat and the canopy;

FIGURE 5 is a sectional view taken generally along line 5—5 of FIGURE 4; and

FIGURE 6 is a sectional view taken generally along the line 6—6 of FIGURE 4.

Figure 1:
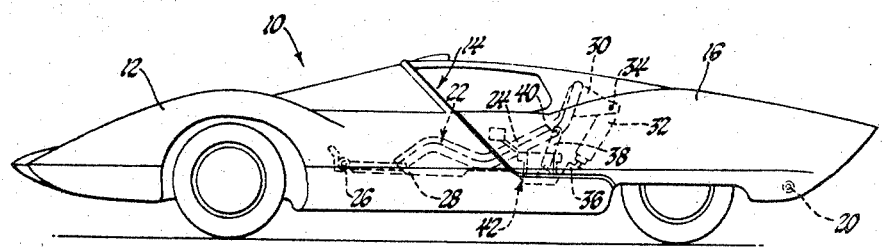
FIGURE 1 is a side elevational view of a vehicle having a seat and canopy according to this invention, with the seat and canopy shown in the lowered and closed positions.
Figure 2:
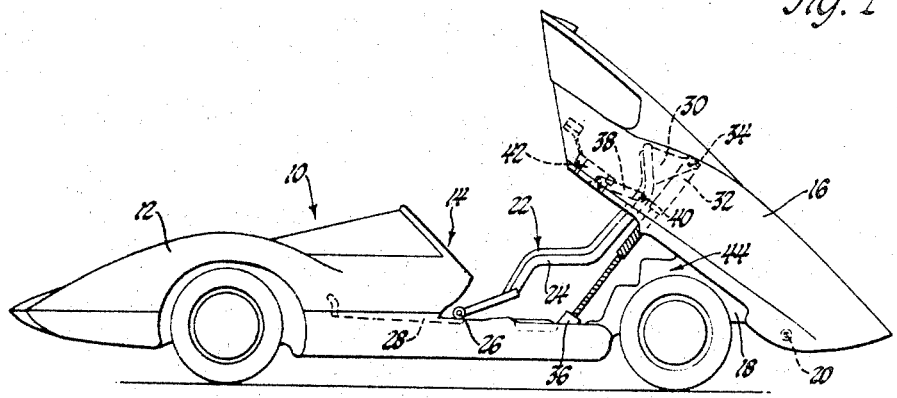
FIGURE 2 is a view similar to FIGURE 1, showing the canopy open and the seat elevated for occupant ingress and egress.

Referring now to FIGURES 1 and 2 of the drawings, a motor vehicle, generally indicated 10, includes a fixed forward body portion 12 having a passenger compartment 14. Compartment 14 is adapted to be closed by a movable rear body portion or canopy 16 which is pivoted at 20 on each side thereof adjacent its lower rear edge to the vehicle frame 18 for movement between a closed position, shown in FIGURE 1, and an open position, shown in FIGURE 2.

A movable seating unit 22 is located within compartment 14 and comprises a left or driver's seat 24 and in identical right or passenger seat, not shown. The means mounting the seats and the means for moving the seats in unison are identical and therefore only the means for the driver's seat 24 are shown and will be described. A roller 26 is affixed to the front edge of seat 24 and is movable longitudinally of the vehicle in a guide track 28. A bracket 30 is mounted on the seat back and extends rearwardly therefrom. An extensible actuator 32 is pivoted at 34 to bracket 30 and is mounted at 36 to the vehicle floor. Actuator 32 may be of any conventional type, such as a hydraulic jack or a recirculating ball-screw actuator, and is extensible to elevate seat 24 from a lowered driving position, shown in FIGURE 1, and an elevated ingress or egress position, shown in FIGURE 2. A link 38 is pivoted at one end 40 to the side of seat 24. Canopy 16 mounts connecting means 42 which engage the other end of link 38 to interconnect the seat and the canopy.

Figure 3:
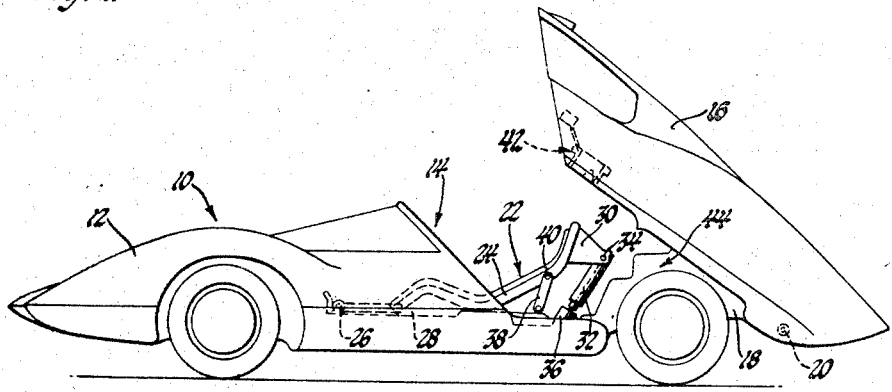
FIGURE 3 is a view similar to FIGURE 1, showing the seat lowered and the canopy opened.

Upon energization, actuator 32 moves seat 24 rearwardly and upwardly, while link 38 effects clockwise pivotal movement of canopy 16, as viewed in FIGURE 2, to open compartment 14 and permit occupant ingress and egress. The connecting means 42 may be disengaged from link 38 to enable movement of canopy 16 independently of seat 24, as shown in FIGURE 3. This permits emergency ingress and egress to compartment 14 in the event of failure of actuator 32 and also permits access to the rear engine compartment 44 without necessitating elevation of seat 24.

The connecting means 42 will now be described in detail with reference to FIGURES 4 and 5. The lower end of link 38 mounts a striker pin 46 which is received within a tapered slot 48 of a bracket 50 mounted on the inner panel 52 of canopy 16. A latch bolt 54 pivoted at 56 to bracket 50 is biased by a tension spring 58 into engagement with striker 46 to normally interconnect the seat 24 and canopy 16 for simultaneous movement.

In order to disengage the canopy from the seat, bolt 54 is pivotable from its latched position, shown in solid lines in FIGURE 4, clockwise to its unlatched position, shown in phantom lines in FIGURE 4, against the bias of spring 58 to release striker 46. Two means for operating bolt 54 will now be described.

Bolt 54 includes a spaced flange 60 which abuts a flnage of an unlatching lever 62 that is pivoted at 64 to bracket 50. Lever 62 mounts a depending operating arm 66 which extends downwardly through aperture 68 in the rocker panel 70 exteriorly of body portion 12. As shown in FIGURE 4, movement of arm 66 counterclockwise from the solid line to the phantom line position pivots bolt 54 clockwise to its unlatched position to release striker 46.

Another means is provided for unlatching bolt 54 from interiorly of the passenger compartment. Bolt 54 includes a spaced pin 72 which is engaged by an arcuate slot 74 formed in one end of an actuating arm 76. The other end of arm 76 is slidably mounted at 78 to bracket 50 and includes a pin 80 which mounts one end of a control wire 82 of a Bowden cable 84. Referring now to FIGURE 6, the other end of wire 82 is connected to a pin 86 of an operating lever 88 that is pivoted at 90 to a bracket 92. A depressed escutcheon 94 secured to the canopy inner panel 52 mounts bracket 92 and includes an aperture 96 through which lever 88 extends into the passenger compartment. A paddle-type handle 98 is provided for pivoting lever 88 counterclockwise from the solid line to the phantom line position to shift wire 82. This extends arm 76 upwardly and to the left, as viewed in FIGURE 4, to pivot bolt 54 clockwise to its unlatched position and disengage striker 46.

It will be noted that the abutting relationship of flange 60 and lever 62 permits arm 76 to move bolt 54 without moving lever 62 and arm 66. Similarly, the lost motion connection comprising pin 72 and slot 74 prevents movement of arm 76, and thus lever 88 and handle 96, upon movement of bolt 54 by lever 62.

Thus, bolt 54 may be unlatched from striker 46 by movement of either remote handle 98 from interiorly of the passenger compartment, or by movement of arm 66 from exteriorly of the passenger compartment to disengage the canopy from the connecting link 38. Since it is now free, the canopy can be moved independently to the open position as shown in FIGURE 3. Upon this movement, striker 46 drops out of slot 48 and link 38 depends freely from seat 24. Upon movement of the canopy to the closed position of FIGURE 1, striker 46 is engaged by the tapered sides of slot 48 and is forced upwardly therein. The striker cams bolt 54 counterclockwise to clear the lower lip thereof and again moves into latching relationship therewith. Thereafter, energization of actuator 32 will again move the canopy in unison with the seat to a FIGURE 2 position.

It is again well to note that the mechanism for moving the seat 24, the connecting mechanism 42 referred to above, and the operating means therefor, are duplicated on the right side of a vehicle.

While only one embodiment of this invention has been shown and described, modifications are contemplated within the scope of this invention.

We claim:

1. In a vehicle body of the type wherein access to a seat in a passenger compartment is gained by raising a canopy which is mounted on the body for movement between raised and lowered positions and which closes the compartment when lowered, the improvement comprising: means mounting the seat on the body for movement between a lowered driving position and a raised position facilitating access to the seat, a power actuator mounted on the body for moving the seat between raised and lowered positions, means operably connecting the canopy to the power actuator whereby the canopy and the seat may be raised and lowered together, and means for disconnecting the canopy from the connecting means to permit independent manual movement of the canopy.

2. In a vehicle body of the type wherein access to a seat in a passenger compartment is gained by raising a canopy which is pivotally mounted on the body rearwardly of the passenger compartment for swinging movement between raised and lowered positions and which closes the compartment when in the lowered position, the improvement comprising: means mounting the seat on the body for movement between a reclining lowered driving position and an upright raised position facilitating access to the seat, a power actuator mounted on the body for moving the seat between the raised and lowered positions, means operably connecting the canopy to the seat whereby the canopy and the seat may be raised and lowered together by the power actuator, and means for disconnecting the canopy from the connecting means to permit independent manual movement of the canopy.

3. In a vehicle body of the type wherein access to a seat in a passenger compartment is gained by raising a canopy which is pivotally mounted on the body about an axis extending laterally of the body rearwardly of the passenger compartment and which provides a cover for the compartment when swung to the lowered position, the improvement comprising: means mounting the seat on the body for movement between a reclining lowered forward position and an upright raised rearward position facilitating access to the seat, a power actuator mounted on the body for moving the seat between the raised and lowered positions, pivot means interconnecting the canopy and the seat whereby the seat and the canopy may be raised and lowered together by the power actuator, and means mounted on the canopy and actuatable from inside and outside the compartment for disconnecting the canopy from the pivot means to permit independent manual movement of the canopy.

4. The combination recited in claim 3, wherein the pivot means include a link pivoted at one end to the seat, and the disconnecting means includes latch means mounted on the canopy and releasably pivotally engaging the other end of the link, a first latch operator actuatable from within the passenger compartment, and a second latch operator actuatable from externally of the vehicle body, the latch operators being actuatable to disengage the latch means from the link to permit the independent manual movement of the canopy.

References Cited

UNITED STATES PATENTS

| | | | |
|---|---|---|---|
| 2,777,728 | 1/1957 | Barenyi | 296—28 |
| 2,785,921 | 3/1957 | Barenyi | 296—28 |
| 2,809,862 | 10/1957 | Daniels | 296—68 |
| 3,147,994 | 9/1964 | Lapine | 296—65 |

RICHARD J. JOHNSON, Primary Examiner

U.S. Cl. X.R.

296—137, 146